United States Patent [19]
Hastings et al.

[11] Patent Number: 4,790,353
[45] Date of Patent: Dec. 13, 1988

[54] ELECTROMAGNETIC HYDRAULIC VALVE OPERATOR

[75] Inventors: Jerome K. Hastings, Sussex; James H. Bigelow, Milwaukee, both of Wis.; Gary Schultz, Novi, Mich.

[73] Assignee: Eaton Corporation, Cleveland, Ohio

[21] Appl. No.: 625,198

[22] Filed: Jun. 28, 1984

Related U.S. Application Data

[63] Continuation of Ser. No. 406,649, Aug. 9, 1982, abandoned.

[51] Int. Cl.[4] .................... F15B 13/044; F16K 31/06

[52] U.S. Cl. .............................. 137/625.65; 137/312; 137/596.17; 137/625.44; 137/870; 251/75; 251/129.1

[58] Field of Search ...................... 137/596.17, 625.65, 137/870, 312, 625.44; 251/75, 137, 129.1; 335/256, 266, 268

[56] References Cited

U.S. PATENT DOCUMENTS

| | | | |
|---|---|---|---|
| 1,523,759 | 1/1925 | Dougherty | 251/75 |
| 1,571,401 | 2/1926 | Erickson | 251/75 |
| 1,603,005 | 10/1926 | Flam | 251/75 |
| 1,605,824 | 11/1926 | Erickson | 251/75 |
| 1,700,029 | 1/1929 | Dady et al. | 251/75 |
| 2,082,121 | 6/1937 | Rypinski . | |
| 2,322,911 | 6/1943 | Beam | 251/137 X |
| 2,332,911 | 10/1943 | Hausler . | |
| 2,417,438 | 3/1947 | O'Brien et al. . | |
| 2,446,855 | 8/1948 | Seibel . | |
| 2,469,976 | 5/1949 | Miller . | |
| 2,598,856 | 6/1952 | Swan et al. . | |
| 2,629,791 | 2/1953 | Le Tourneau . | |
| 2,934,090 | 4/1960 | Kenann et al. | 137/312 X |
| 2,967,983 | 1/1961 | Danklefs . | |
| 3,040,217 | 6/1962 | Conrad . | |
| 3,183,410 | 5/1965 | Flora . | |
| 3,242,283 | 3/1966 | Clements . | |
| 3,260,814 | 7/1966 | Turnbull . | |
| 3,354,274 | 11/1967 | Bauer . | |
| 3,426,800 | 2/1969 | Bauer | 137/870 |
| 3,707,984 | 1/1973 | Bantz | 137/312 |
| 3,743,898 | 7/1973 | Sturman . | |
| 3,771,760 | 11/1973 | Sheldon et al. | 251/75 |
| 3,784,943 | 1/1974 | Markowitz et al. . | |
| 3,900,822 | 8/1975 | Hardwick et al. . | |
| 3,983,351 | 9/1976 | Bauer . | |
| 4,010,769 | 3/1977 | De Lorenzo et al. | 137/312 |
| 4,142,553 | 3/1979 | Sakakibara et al. | 251/75 X |
| 4,165,762 | 8/1979 | Acar | 137/625.65 X |
| 4,253,493 | 3/1981 | English | 137/625.65 X |
| 4,254,313 | 3/1981 | Baader . | |
| 4,320,371 | 3/1982 | Coyle et al. . | |
| 4,422,060 | 12/1983 | Matsumoto et al. . | |

FOREIGN PATENT DOCUMENTS

| | | | |
|---|---|---|---|
| 112064 | 9/1964 | Czechoslovakia . | |
| 36295 | 10/1971 | Japan | 251/75 |
| 1046223 | 10/1966 | United Kingdom . | |

OTHER PUBLICATIONS

"Electromagnetic Devices", by H. C. Roters, John Wiley and Sons, 1941, pp. 242-306.
Design News, Dec. 3, 1984, p. 60.
Illustrated Encyclopedic Dictionary of Electronics, John Douglas-Young, p. 438.
Metals Handbook Ninth Edition, vol. 2, p. 3, "Introduction to Aluminum and Aluminum Alloys".
Electromagnetic Devices, Herbert C. Roters, John Wiley & Sons, Inc., New York, pp. 16 and 69.

*Primary Examiner*—Gerald A. Michalsky
*Attorney, Agent, or Firm*—Andrus, Sceales, Starke & Sawall

[57] ABSTRACT

An electromagnetically actuated hydraulic switch unit is provided by an armature plunger which reciprocally shuttles between partially overlapping magnetic paths and operating a hydraulic valve circuit through bistable snap blade means. Snap blades open and close entry ports, exit ports and vent ports to connect various passages in a housing and perform given hydraulic functions. The ratio of the permeances of the two magnetic paths, created by dedicated coaxial coils, is controlled such that one path always overpowers the other by an amount greater than the mechanical gradients of a pair of snap blades in hydraulic fluid filled cavities, to insure plunger movement in either direction.

31 Claims, 1 Drawing Sheet

ELECTROMAGNETIC HYDRAULIC VALVE OPERATOR

This is a continuation of application Ser. No. 406,649, filed Aug. 9, 1982, now abandoned.

BACKGROUND AND SUMMARY

The invention relates to an electromagnetically actuated hydraulic valve switching unit.

An armature plunger reciprocally shuttles between two magnetic paths. A pair of coils are energizable to create magnetic fluxes having portions of their linkage paths in common, including through the plunger. When either coil is energized, a flux path is created around that coil through the plunger, and another flux path is created around both coils through the plunger. The ratio of the permeances of the two paths is controlled such that one path always overpowers the other, to insure plunger movement in either direction.

The armature plunger actuates bistable snap blade means in a hydraulic valve circuit. A housing includes a cavity into which a portion of the armature plunger extends an engages the snap blade. The housing has a hydraulic fluid entry port into the cavity, a hydraulic fluid exit port out of the cavity, and a hydraulic fluid vent port out of the cavity. A first position of the snap blade blocks the vent port and opens the entry port such that hydraulic fluid may flow from the entry port to the exit port. A second position of the snap blade blocks the entry port such that hydraulic fluid may flow from the exit port to the vent port. The preferred embodiment further includes a second vent port comprising an annulus around a shaft segment of the armature within a journaled portion of the housing for venting hydraulic fluid from the cavity along the shaft-journal interface. The preferred emobidment further includes dual snap blades and cavities at opposite ends of the armature plunger for tandem operation of a hydraulic circuit.

DETAILED DESCRIPTION

Figure 1:
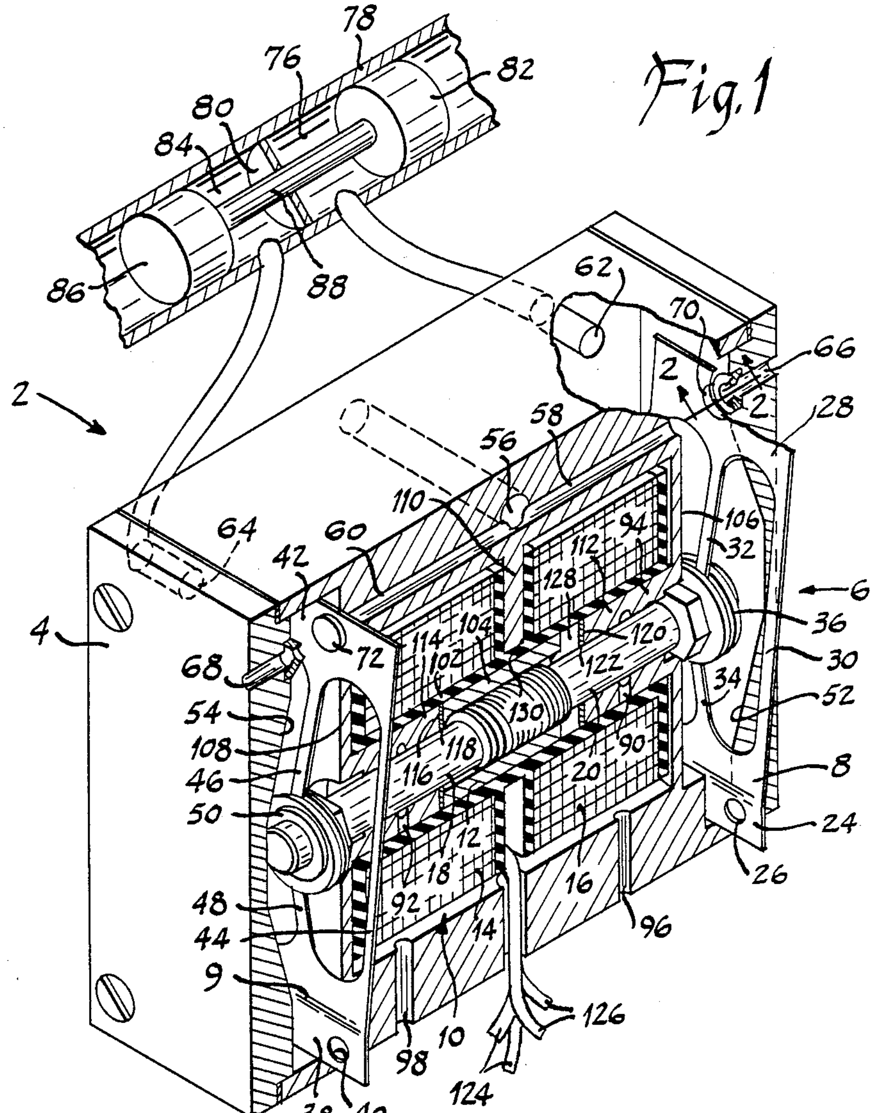
FIG. 1 is a cutaway isometric view of an electromagnetically actuated hydraulic valve switching unit constructed in accordance with the invention.

Switching unit 2 includes a housing 4 having hydraulic valve means 6, including bistable snap blade means 8 and 9 operable between different hydraulic circuit positions, and having electromagnetic actuator means 10 for operating the hydraulic valve snap blade. Electromagnetic actuator means 10 includes an armature plunger 12 axially reciprocal left and right according to energization of left or right coil 14 or 16. Armature plunger 12 includes left and right extension shafts 18 and 20 fixedly secured to plunger 12 in threaded relation.

Bistable snap blades 8 and 9 are actuated between their bistable positions by shafts 20 and 18. Snap blade 8 has a lower end 24 fixedly secured in housing 4, for example by rivet 26. Snap blade 8 has an upper end 28 which is free to move left and right. The top and bottom ends 28 and 24 of snap blade 8 are connected by outer side segments one of which 30 is seen in FIG. 1. Double Euler beams are formed by a pair of cantilever arms 32 and 34 extending from respective top and bottom ends of the snap blade to a gap therebetween. Shaft 20 extends into this gap and engages the opposing facing edges of cantilever arms 32 and 34 by a staked washer arrangement 36.

Snap blade 9 is comparable and includes a bottom end 38 fixed in housing 4 by rivet mount 40, and having an upper free end 42 for left-right movement. Top and bottom ends 42 and 40 are joined by outer side segments one of which 44 is seen in FIG. 1. Double Euler beams are formed by a pair of cantilever arms 46 and 48 and engaged in the gap therebetween by shaft 18 at staked washers 50.

In FIG. 1, plunger 12 and shafts 18 and 20 are in their leftward position. Top free ends 42 and 28 of snap blades 9 and 8 are in their rightward position, and cantilever arms 46 and 48, and 32 and 34, are bowed leftwardly. When plunger 12 and shafts 18 and 20 are moved rightwardly, to be described, cantilever arms 46 and 48, and 32 and 34, are deflected, which flexure stores potential energy therein. When the cantilever arms are moved through center by travel of the shafts, the stored energy is released and top free ends 42 and 28 of the blades snap leftwardly to their leftward stable position. Plunger 12 and shafts 18 and 20 are then in their rightward position, and cantilever arms 46 and 48 and 32 and 34, are bowed rightwardly. Return travel of the plunger and shafts moves the cantilever arms back through center and the top free ends of the blades snap back rightwardly to their right stable position as shown in FIG. 1.

Figure 2:
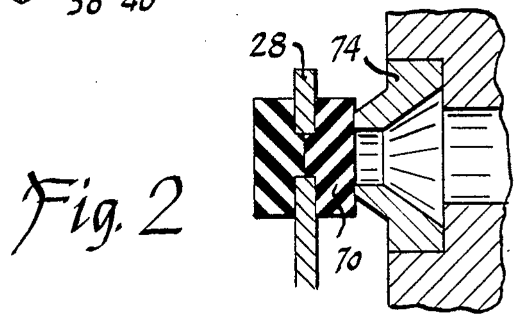
FIG. 2 is an isolated cross sectional view of a portion of FIG. 1.

Housing 4 includes cavities 52 and 54 into which the shaft portions 18 and 20 of the armature plunger 12 extend and engage their respective snap blades 8 and 9. A hydraulic fluid entry port into cavities 52 and 54 is provided by port 56 and channels 58 and 60. Hydraulic fluid exit ports out of cavities 52 and 54 are provided by exit passages 62 and 64. Hydraulic fluid vent ports out of cavities 52 and 54 are provided by passages 66 and 68. Snap blades 8 and 9 have respective hydraulic valve seating pads 70 and 72 at their top free ends for engaging in sealing relation raised frustoconical seats, such as 74, FIG. 2 on entry port passages 58 and 60 and vent port passages 66 and 68.

When the top free ends 28 and 42 of the snap blades are in their rightward position as shown in FIG. 1, vent port 66 is blocked and entry port passage 58 is open such that hydraulic fluid may flow from entry port passage 56 into cavity 52 and out through exit port 62. This hydraulic fluid flow may perform a designated function, for example actuating a clutch by introducing hydraulic fluid into an actuation chamber 76 of a clutch housing 78 having a central fixed dividing wall 80. The hydraulic fluid pressure in chamber 76 drives piston 82 rightwardly. Also, when top free end 42 of snap blade 9 is in its rightward position as shown in FIG. 1, entry port passage 60 is blocked and vent port 68 is open. Hydraulic fluid may flow from port 64 into cavity 54 and out through passage 68. This in turn enables hydraulic fluid in chamber 84 of the clutch housing to be expelled and thus permit rightward movement of piston 86 which is rigidly secured to piston 82 by means of connecting shaft 88 extending through center dividing wall 80. The noted clutch application is of course only exemplary.

Housing 4 further includes second vent ports comprising annulus 90 and annulus 92 around respective shafts 20 and 18. Housing 4 includes a yoke segment 94 through which the shafts extend in journaled relation. Annuli 90 and 92 are formed in this housing yoke segment Vent passages 96 and 98 communicate with respective annuli 90 and 92 for venting hydraulic fluid from respective cavities 52 and 54 along the shaft-journal interface through respective annuli 90 and 92 and out vent passages 96 and 98. These second vent ports 90 and 92 are preferred where it is desired to avoid a tight seal at the shaft-journal interface. This in turn enhances speed of operation. Also, the cantilever arms and outer side segments of the snap blades are formed by wire-like members to effectively slice through the hydraulic fluid with minimal resistance, to further enhance speed of operation.

When plunger 12 and shafts 20 and 18 are actuated to their rightward position, upper free ends 28 and 42 of the snap blades snap to their leftward stable position. In this state of switching unit 2, hydraulic contact 70 blocks entry port passage 58 such that hydraulic fluid may flow from port 62 into cavity 52 and out passage 66. Hydraulic contact 72 blocks vent port 68, such that hydraulic fluid may flow from entry port 56 into cavity 54 and out through exit port 64 into chamber 84 to thus drive piston 86 leftwardly.

Electromagnetic actuator means 10 in housing 4 includes the noted left and right coaxial coils 14 and 16 energizable to create magnetic flux. These coils are wound on an insulating bobbin 102 which includes axial passage 104 therethrough for guiding reciprocal axial movement of armature plunger 12. Magnetically permeable yoke 94 directs the flux paths of the coils. The yoke comprises an E-shaped member having right and left outer legs 106 and 108 and a center leg 110 between the coils. The outer legs 106 and 108 extend back inwardly axially at 112 and 114 and have axial bores therethrough for guiding axial reciprocal movement of shafts 20 and 18 and form the journaled interface therewith through housing 4. Yoke segment 114 has an inner edge 116 forming a shoulder stop limiting leftward axial movement of plunger 12, and further includes a nonmagnetic spacer washer 118 between plunger 12 and yoke segment 114 abutting stop shoulder 116. Yoke segment 112 includes an inner edge 120 providing a stop shoulder for limiting rightward axial movement of plunger 12, and further including a nonmagnetic spacer washer 122 abutting stop shoulder 120. Wire pair 124 is provided for energizing coil 14 and wire pair 126 is provided for energizing coil 16.

If armature plunger 12 is in its leftward position as shown in FIG. 1, and if right coil 16 is energized, a primary flux path is created around energized coil 16 and a secondary flux path is created around both coils 14 and 16. The primary flux path around the energized coil 16 extends through right outer yoke leg 106, through axial yoke segment 112, through axial magnetic air gap 128 between plunger 12 and spacer 122 against shoulder stop 120, through plunger 12, through radial gap 130 across bobbin 102 between plunger 12 and center yoke leg 110, through center yoke leg 110, and back along the top of the yoke to right outer yoke leg 106 to complete the primary loop. The secondary flux path extends through right outer yoke leg 106, through axial yoke segment 112, through axial magnetic air gap 128, through plunger 12 through spacer 118 and shoulder stop 116, through axial yoke segment 114, through left outer yoke leg 108, and back through the top yoke segment to the right outer yoke leg 106 to complete the secondary loop. The primary path flux force pulls armature plunger 12 rightwardly to close axial magnetic air gap 128 and open a second gap between the left edge of plunger 12 and spacer 118 against stop shoulder 116. The secondary path flux force tends to hold the plunger in place in its leftward position with the left gap closed and the right gap 128 open.

The ratio of the permeances of the two paths is controlled such that one path always overpowers the other, to insure plunger movement in either direction for actuating the snap blades. The ratio of the radial width of gap 130 to the axial width of spacer 118 sets the ratio of the primary and secondary flux forces, whereby to control the net magnitude and direction of force on the plunger upon energization of right coil 16. The primary force is made to be always stronger than the secondary force. The structure is symmetric, and the same considerations apply for leftward movement of the plunger from its rightward position. The ratio of the noted widths may be determined empirically, or mathematically from simultaneous solution of Gaussian equations. In one implenentation, the width of radial gap 130 is 0.012 inch and the axial width of each of spacers 118 and 122 is 0.010 inch. It is to be noted that the width of axial magnetic air gap 128 is set by the axial width of spacer 118. Likewise, the axial width of the left gap when the plunger is in the rightward position is set by the axial width of spacer 122.

As noted, the structure is symmetric, and thus the above description applies equally for the reverse direction leftward movement of armature plunger 12 in response to energization of left coil 14. The noted ratio of the widths is set such that the primary flux force is greater than the secondary flux force, and such that the difference therebetween is greater than the mechanical gradient of the snap blades whereby to insure actuation of the latter.

It is to be noted that movement of the plunger induces a voltage signal in the nonenergized coil. This voltage signal may be used to afford feedback verification of actuation of the plunger to its alternate position. This feedback verification is afforded using existing flux linkages, with additional sensing circuitry.

Armature shuttle plunger 12 is thus reciprocal in housing 4 between left and right positions respectively closing and opening first and second gaps between plunger 12 and yoke 94 at shoulder stops 116 and 120. Plunger 12 is in overlapping flux paths in each of its left and right positions. Energization of the right coil 16 creates a primary flux around the latter attracting the plunger to its rightward position to close right gap 128 and open a left gap between the left edge of plunger 12 and washer 118 against left shoulder stop 116. Energization of right coil 16 also creates a secondary flux around both coils attracting plunger 12 to remain in its leftward position with the left gap closed and the right gap 128 open. Energization of left coil 14 creates a primary flux around the latter attracting plunger 12 to its leftward position to close the left gap and open the right gap 128, and creates a secondary flux around both coils attracting plunger 12 to remain in its rightward position with right gap 128 closed and the left gap open. The force on plunger 12 from the primary flux path around either coil is always stronger than the force on the plunger from the secondary path.

It is recognized that various modifications are possible within the scope of the appended claims.

We claim:

1. An electromagnetically actuated hydraulic switch, comprising:

a housing;

hydraulic valve means in said housing, including bistable snap blade means operable between different hydraulic circuit positions; and electromagnetic actuator means mounted in said housing for actuating said snap blade means, wherein said electromagnetic actuator means comprises coil means energizable to create magnetic flux, yoke means for directing the flux path of said coil means, and movable armature means responsive to energization of said coil means to actute said snap blade means.

wherein said housing includes a cavity into which a portion of said armature means extends and engages said snap blade means, and including a hydraulic fluid entry port into said cavity, a hydraulic fluid exit port out of said cavity, and a hydraulic fluid vent port out of said cavity, said snap blade means in a first position blocking said vent port and opening said entry port such that hydraulic fluid flow may flow from said entry port to said exit port, said snap blade means in a second position blocking said entry port such that hydraulic fluid may flow from said exit port to said vent port.

wherein said housing has a second cavity into which an opposite distal portion of said armature means extends and engages second bistable snap blade means operable between different hydraulic circuit positions.

2. The invention according to claim 1 wherein said entry port supplied hydraulic fluid into said second cavity, and including a hydraulic fluid exit port out of said second cavity and a hydraulic fluid vent port out of said second cavity, said second snap blade means in a first position blocking said entry port such that hydraulic fluid may flow from said exit port to said vent port of said second cavity, said second snap blade means in a second position blocking said vent port and opening said entry port of said second cavity such that hydraulic fluid may flow from said entry port to said exit port of said second cavity, said armature means actuating both of said snap blade means in tandem between said first positions and said second positions.

3. The invention according to claim 2 wherein said armature means extends at its distal ends into each of said cavities from journaled portions of said housing around shaft segments of said armature means, and wherein said housing further includes first and second auxiliary vent ports each comprising an annulus around a respective said shaft segment for venting hydraulic fluid from a respective said cavity along the shaft segment-journal interface through said annulus and respective auxiliary vent port.

4. An electromagnetically actuated hydraulic switch, comprising:

a housing;

hydraulic valve means in said housing, including bistable snap blade means operable between different hydraulic circuit positions; and electromagnetic actuator means mounted in said housing for actuating said snap blade means, wherein said electromagnetic actuator means comprises coil means energizable to create magnetic flux, yoke means for directing the flux path of said coil means, and movable armature means responsive to energization of said coil means to actuate said snap blade means, and wherein said housing includes a cavity into which a portion of armature means extends and engages said snap blade means, said armature means including a plunger reciprocal in a journaled portion of said housing, and including a hydraulic fluid entry port into said cavity, a hydraulic fluid exit port out of said cavity, and a hydraulic fluid vent port out of said cavity, said snap blade means in a first position blocking said vent port and opening said entry port such that hydraulic fluid may flow from said entry port to said exit port, said snap blade means in a second position blocking said entry port such that hydraulic fluid may flow from said exit port to said vent port, wherein said bistable snap blade means comprises a flexible member rigidly mounted at one end in said housing and having a hydraulic valve contact at the other end, and including a pair of wire-like cantilever arms each extending from a respective one of said ends towards each other to a gap therebetween to be engaged by said armature means, and wherein said ends are connected by a pair of wire-like outer side segments, said wire-like cantilever arms extending between and parallel to said wire-like outer side segments.

5. An electromagnetically actuated hydraulic switch, comprising:

a housing;

hydraulic valve means in said housing, including bistable snap blade means operable between different hydraulic circuit positions; and electromagnetic actuator means comprising an armature plunger axially reciprocally shuttling between closed loop returned magnetic paths provided by a pair of coaxial coils energizable to create magnetic fluxes having portions of their linkage paths in common including through said plunger, such that when either coil is energized a flux path is created around that coil through the plunger, and another flux path is created around both coils through the plunger, and comprising permeance control means including magnetically continuous yoke means controlling the ratio of permeances of the two paths such that one path always overpowers the other, to insure plunger movement in either direction for actuating said snap blade means, the flux paths from the axial ends of said plunger extending substantially only axially to said yoke means, said yoke means having a central leg extending radially between said coils, said leg having an inner end facing said plunger and separated therefrom by a radial gap, the axial length of said radial gap being no greater than the axial spacing of said coils.

6. An electromagnetically actuated hydraulic switch, comprising:

a housing;

hydraulic valve means in said housing including bistable snap blade means operable between different hydraulic circuit positions, and including hydraulic port means in said housing engaged by said snap blade means; and electromagnetic actuator means comprising an armature plunger axially reciprocally shuttling between closed loop returned magnetic paths having common overlapping portions through the plunger provided by yoke means directing the flux paths of a pair of coils such that when either coil is energized a first flux path is created around that coil through the plunger and a second flux path is created around both coils through the plunger, the first path pulling the plunger to close a magnetic air gap, the second path holding the plunger in place, the ratio of the permeances of the two paths being controlled such that one path always overpowers the other, to insure plunger movement in either direction for actuating said snap blade means, said snap blade means extending transversely to the axial movement of said plunger and having a distal end with a hydraulic contact laterally offset from the axis of reciprocation of said plunger and movable between said different hydraulic circuit positions engaging respective said port means, wherein said coils are coaxial and said yoke means is magnetically continuous, the flux paths from the axial ends of said plunger extending substantially only axially to said yoke means, said yoke means having a central leg extending radially between said coils, said leg having an inner end facing said plunger and separated therefrom by a radial gap, the axial length of said radial gap being no greater than the axial spacing of said coils.

7. The invention according to claim 6 wherein said plunger is reciprocal between first and second position, and including first nonmagnetic space means axially between said yoke means and said plunger in said first position of the latter, and second nonmagnetic spacer means axially between said yoke means and said plunger in said second position of the latter.

8. An electromagnetically actuated hydraulic switch comprising:

a housing having a cavity with hydraulic port means;

hydraulic valve means in said housing, including bistable snap blade means in said cavity and operable between different hydraulic circuit positions to engage said hydraulic port means for opening and blocking the latter;

a pair of coils coaxially mounted in said housing and energizable to create magnetic flux;

magnetically continuous yoke means in said housing for directing the flux paths of said coils in closed loop returned paths through portions of common overlapping flux linkage; and an armature shuttle plunger axially reciprocal in a journaled portion of said housing according to energization of a respective said coil such that when either coil is energized a flux path is created around that coil through the plunger and another flux path is created around both coils through the plunger, the flux paths from the axial ends of said plunger extending substantially only axially to said yoke means, said yoke means having a central leg extending radially between said coils, said leg having an inner end facing said plunger and separated therefrom by a radial gap, the axial length of said radial gap being no greater than the axial spacing of said coils, said yoke means controlling the ratio of the permeances of the two paths such that one path always overpowers the other, to insure plunger movement in either direction for actuating said snap blade means.

9. The invention according to claim 8 wherein said common overlapping linkage path extends axially through said plunger, and said plunger reciprocates axially therealong.

10. The invention according to claim 9 wherein said flux path around the energized coil tends to pull said plunger to close an axial magnetic air gap, and said other flux path around both coils tends to hold said plunger in place.

11. An electromagnetically actuated hydraulic switch, comprising:

a housing having a cavity with hydraulic ports;

hydraulic valve means in said housing, including bistable snap blade means in said cavity and operable between different hydraulic circuit positions for engaging said hydraulic ports for opening and blocking the latter;

first and second coaxial coils in said housing energizable to create magnetic flux;

magnetically continuous yoke means in said housing for directing the flux of said coils in partially overlapping closed loop returned paths;

an armature shuttle plunger in said housing axially reciprocal between first and second positions respectively closing and opening first and second axial gaps between said plunger and said yoke means, said plunger being in said overlapping flux paths in each of said first and second positions, reciprocation of said plunger actuating said snap blade means, said snap blade means extending transversely to the axial movement of said plunger and having a distal end with a hydraulic contact laterally offset from the axis of reciprocation of said plunger and movable between said different hydraulic circuit positions engaging respective said ports, energization of said first coil creating a primary flux around the latter attracting said plunger to said first position to close said first gap and open said second gap, and creating a secondary flux around both said coils attracting said plunger to remain in said first gap open energization of said second coil creating a primary flux around the latter attracting said plunger to said second position to close said second gap and open said first gap, and creating a secondary flux around both said coils attracting said plunger to remain in said first position with said first gap closed and said second gap open the flux paths from the axial ends of said plunger extending substantially only axially to said yoke means, said yoke means having a central leg extending radially between said coils, said leg having an inner end facing said plunger and separated therefrom by a radial gap, the axial length of said radial gap being no greater than the axial spacing of said coils the force on said plunger from said primary flux around either said coil always being stronger than the force on said plunger from said secondary flux, such that said plunger moves in either direction responsive to the primary flux in the open gap and actuates said snap blade means.

12. The invention according to claim 11 comprising first and second nonmagnetic spacer means in said first and second gaps between said plunger and said yoke means.

13. An electromagnetically actuated hydraulic switch, comprising:

a housing having a cavity with hydraulic ports;

hydraulic valve means in said housing, including bistable snap blade means in said cavity and operable between different hydraulic circuit positions of engaging said hydraulic ports for opening and blocking the latter;

first and second coils in said housing energizable to create magnetic flux;

yoke means in said housing for directing the flux of said coils in partially overlapping closed loop returned paths;

an armature shuttle plunger in said housing reciprocal between first and second positions respectively closing and opening first and second gaps between said plunger and said yoke means, said plunger being in said overlapping flux paths in each of said first and second positions, reciprocation of said plunger actuating said snap blade means, energization of said first coil creating a primary flux around the latter attracting said plunger to said first position to close said first gap and open said second gap, and creating a secondary flux around both said coils attracting said plunger to remain in said second position with said second gap closed and said first gap open, energization of said second coil creating a primary flux around the latter attracting said plunger to said second position to close said second gap and open said first gap, and creating a secondary flux around both said coils attracting said plunger to remain in said first position with said first gap closed and said second gap open, the force on said plunger from said primary flux around either said coil always being stronger than the force on said plunger from said secondary flux such that said plunger moves in either direction responsive to the primary flux in the open gap and actuates said snap blade means, wherein said snap blade means comprises a flexible member rigidly mounted at one end in said housing and having a hydraulic contact at the other end, and including a pair of cantilever arms each extending from a respective one of said ends towards each other to a gap therebetween, said plunger engaging said cantilever arms in actuating relation to flex said snap blade means between bistable overcenter snap-action positions, said cantilever arms being bowed in one direction in a first stable position and being bowed in the opposite direction in the alternate stable position.

14. An electromagnetically actuated hydraulic switch, comprising:

a housing;

hydraulic valve means in said housing, including bistable snap blade means operable between different hydraulic circuit positions;

a pair of coils coaxially mounted in said housing and energizable to create magnetic flux;

magnetically continuous yoke means in said housing for directing the flux paths of said coils; and a shuttle plunger axially reciprocal in said housing between first and second positions according to energization of a respective said coil providing a primary flux path around the respective said coil through said yoke means and said plunger, and providing a secondary flux path around both said coils through said yoke means and said plunger, such that the primary path flux force around either coil is always stronger than the secondary path, the flux paths from the axial ends of said plunger extending substantially only axially to said yoke means, said yoke means having a central leg extending radially between said coils, said leg having an inner end facing said plunger and separated therefrom by a radial gap, the axial length of said radial gap being no greater than the axial spacing of said coils, said plunger engaging said snap blade means in actuating relation to operate the latter between said hydraulic circuit positions corresponding to said first and second positions of said plunger.

15. The invention according to claim 14 wherein:

said yoke means includes first and second axially spaced stop shoulders for limiting said axial movement of said plunger at respective said first and second positions corresponding to said hydraulic circuit positions of said snap blade means;

such that when said plunger is in said second position and said first coil is energized, said primary flux path extends around said first coil through said yoke means and across an axial gap between said first stop shoulder of said yoke means and said plunger and through said plunger and across said radial gap between said plunger and said central leg of said yoke means, and said secondary path extends around both said coils through said yoke means and across an axial gap between said first stop shoulder of said yoke means and said plunger and through said plunger and through said second stop shoulder of said yoke means; and such that when said plunger is in said first position and said second coil is energized, said primary flux path extends around said second coil through said armature means and across an axial gap between said second stop shoulder of said yoke means and said plunger and through said plunger and across said radial gap between said plunger and said central leg of said yoke means, and said secondary path extends around both said coils through said yoke means and across said axial gap between said second stop shoulder of said yoke means and said plunger and through said plunger and through said first stop shoulder of said yoke means.

16. The invention according to claim 15 comprising first nonmagnetic spacer means between said plunger and said first stop shoulder of said yoke means, and second nonmagnetic spacer means between said plunger and said second stop shoulder of said yoke means, and wherein said yoke means comprises E-shaped means having first and second outer legs and a center leg forming said central portion, said first coil being between said center leg and said first outer leg, said second coil being between said center leg and said second outer leg.

17. The invention according to claim 16 wherein said first stop shoulder is on said first outer leg of said E-shaped means, and said second stop shoulder is on said second outer leg of said E-shaped means, and wherein said coaxis of said coils is the same axis of reciprocation of said plunger, said outer legs and said center leg of said E-shaped means extend parallel to each other and perpendicular to said axis.

18. The invention according to claim 17 wherein:

said plunger slides along said axis between said first and second shoulder stops, with said gap between said plunger and said center leg of said E-shaped yoke means remaining the same;

said gap between said first shoulder stop and said plunger in said second position is set by the axial width of said second spacer means; and said gap between said second shoulder stop and said plunger in said first position is set by the axial width of said first spacer means.

19. The invention according to claim 18 wherein:

energization of said first coil, when said plunger is in said second position, creates said primary path flux force attracting said plunger to said first position closing the gap between said plunger and said first shoulder stop, and creates said secondary path flux force attracting said plunger to remain in said second position;

the ratio of the radial width of said gap between said plunger and said center leg of said E-shaped yoke means to the axial width of said second spacer means setting the ratio of said last mentioned primary and secondary flux forces whereby to control the net magnitude and direction of force on said plunger upon energization of said first coil;

energization of said second coil, when said plunger is in said first position, creates said primary path flux force attracting said plunger to said second position closing the gap between said plunger and said second shoulder stop, and creates said secondary path flux force attracting said plunger to remain in said first position; and the ratio of the radial width of said gap between said plunger and said center leg of said E-shaped yoke means to the axial width of said first spacer means setting the ratio of said last mentioned primary and secondary flux forces whereby to control the net magnitude and direction of force on said plunger upon energization of said second coil.

20. The invention according to claim 19 wherein said bistable snap blade means remains stable and holds said plunger in said first or second position until the mechanical gradient of said snap blade means is overcome by the net magnetic gradient on said plunger.

21. An electromagnetically actuated hydraulic switch, comprising:

a housing;

hydraulic valve means in said housing, including bistable snap blade means operable between different hydraulic circuit positions;

a pair of coils coaxially mounted in said housing and energizable to create magnetic flux;

yoke means in said housing for directing the flux paths of said coils; and a shuttle plunger axially reciprocal in said housing between first and second positions according to energization of a respective said coil providing a primary flux path around the respective said coil through said yoke means and said plunger, and providing a secondary flux path around both said coils through said yoke means and said plunger, such that the primary path flux force around either coil is always stronger than the secondary path, said plunger engaging said snap blade means in actuating relation to operate the latter between said hydraulic circuit positions corresponding to said first and second positions of said plunger;

said yoke means includes first and second axially spaced stop shoulders for limiting said axial movement of said plunger at respective said first and second positions corresponding to said hydraulic circuit positions of said snap blade means.

said yoke means includes a central portion between said coils and spaced from said plunger;

such that when said plunger is in said second position and said first coil is energized, said primary flux path extends around said first coil through said yoke means and across an axial gap between said first stop shoulder of said yoke means and said plunger and through said plunger and across a radial gap between said plunger and said central portion of said yoke means, and said secondary path extends around both said coils through said yoke means and across an axial gap between said first stop shoulder of said yoke means and said plunger and through said plunger and through said second stop shoulder of said yoke means; and such that when said plunger is in said first position and said second coil is energized, said primary flux path extends around said second coil through said armature means and across an axial gap between said second stop shoulder of said yoke means and said plunger and through said plunger and across said radial gap between said plunger and said central portion of said yoke means, and said secondary path extends around both said coils through said yoke means and across said axial gap between said second stop shoulder of said yoke means and said plunger and through said plunger and through said first stop shoulder of said yoke means, wherein said snap blade means comprises a flexible member rigidly mounted at one end in said housing and having a hydraulic contact at the other end, and including a pair of cantilever arms each extending from a respective one of said ends towards each other to a gap therebetween, said plunger engaging said cantilever arms in actuating relationship to flex said snap blade means between bistable overcenter snap-action positions, said cantilever arms being bowed in one direction in a first stable position and being bowed in the opposite direction in the other alternate stable position.

22. . An electromagnetically actuated hydraulic switch, comprising:

a housing;

hydraulic valve means in said housing, including bistable snap blade means comprising a flexible member rigidly mounted at one end in said housing and having a hydraulic contact at the other end, and including a pair of cantilever arms each extending from a respective one of said ends towards each other to a gap therebetween; and magnetic actuator means mounted in said housing and extending into said gap and engaging said cantilever arms to actuatingly flex said snap blade means between bistable overcenter snap-action positions.

23. The invention according to claim 22 wherein said magnetic actuator means engages said cantilever arms between the facing edges thereof.

24. The invention according to claim 23 wherein said ends of said flexible member are connected by a pair of outer side segments, and said cantilever arms extend between and parallel to said side segments, and wherein said flexible member is generally planar, and the directions of movement of said magnetic actuator means and said other free end are parallel to each other and perpendicular to the plane of said member, said opposing cantilever arms minimizing lateral bias on said magnetic actuator means.

25. The invention according to claim 22 wherein said magnetic actuator means comprises:

a pair of coils in said housing energizable to create magnetic flux;

a shuttle plunger in said housing movable between first and second positions corresponding to hydraulic circuit positions of said snap blade means;

yoke means in said housing for directing the flux paths of said coils, said yoke means having a first portion spaced from said plunger by a first gap when said plunger is in said second position, said yoke means having a second portion spaced from said plunger by a second gap when said plunger is in said first position, said yoke means having a third portion spaced from said plunger by a third gap in each of said first and second plunger positions;

such that when said plunger is in said second position and said first coil is energized, a primary flux path is created and extends around said first coil through said yoke means and said plunger and across said first and third gaps, and a secondary flux path is created and extends around both said coils through said yoke means and said plunger and across said first gap, said primary path flux force attracting said plunger to said first position to close said first gap, said secondary path flux force attracting said plunger to remain in said second position; and such that when said plunger is in said first position and said second coil is energized, a primary flux path is created and extends around said second coil through said yoke means and said plunger and across said second and third gaps, and a secondary flux path is created and extends around both said coils through said yoke means and said plunger and across said second gap, said last mentioned primary path flux force attracting said plunger to said second position to close said second gap, said last mentioned secondary path flux force attracting said plunger to remain in said first position, the force on said plunger from said primary flux around either said coil always being stronger than the force on said plunger from said secondary flux such that said plunger moves in either direction responsive to the primary flux in the open gap and actuates said snap blade means.

26. The invention according to claim 25 comprising:

first nonmagnetic spacer means between said yoke means and said plunger in said first position, the ratio of the width of said spacer means to the width of said third gap setting the ratio of said second mentioned primary and secondary flux forces such that the primary flux force is greater than the secondary flux force, and such that the difference therebetween is greater than the mechanical gradient of said snap blade means whereby to insure actuation of the latter; and second nonmagnetic spacer means between said yoke means and said plunger in said second position, the ratio of the width of said second spacer means to the width of said third gap setting the ratio of said first mentioned primary and secondary flux forces such that the primary flux force is greater than the secondary flux force, and such that the difference therebetween is greater than the mechanical gradient of said snap blade means whereby to insure actuation of the latter.

27. An electromagnetically actuated bistable hydraulic switch combination with zero holding energy, comprising:

a housing;

hydraulic valve means in said housing, including bistable snap blade means operable between different hydraulic circuit positions, and comprising a flexible member rigidly mounted at one end in said housing and having a hydraulic contact at the other end, and including a pair of cantilever arms each extending from a respective one of said ends towards each other to a gap between;

a pair of coils coaxially mounted in said housing and energizable to create magnetic flux;

yoke means in said housing for directing the flux paths of said coils; and a shuttle plunger axially reciprocal in said coils between first and second positions according to energization of a respective said coil providing a primary flux path around the respective said coil through said yoke means and said plunger, and providing a secondary flux path around both said coils through said yoke means and said plunger, such that the primary path flux force around either coil is always stronger than the secondary path flux force.

28. The invention according to claim 27 wherein:

said yoke means includes first and second axially spaced stop shoulders for limiting said axial movement of said plunger at respective said first and second positions;

said yoke means includes a central portion between said coils and spaced from said plunger;

such that when said plunger is in said second position and said first coil is energized, said primary flux path extends around said first coil through said yoke means and across an axial gap between said first stop shoulder of said yoke means and said plunger and through said plunger and across a radial gap between said plunger and said central portion of said yoke means, and said secondary path extends around both said coils through said yoke means and across said axial gap between said first stop shoulder of said yoke means and said plunger and through said plunger and through said second stop shoulder of said yoke means;

such that when said plunger is in said first position and said second coil is energized, said primary flux path extends around said second coil through said yoke means and across an axial gap between said second stop shoulder of said yoke means and said plunger and through said plunger and across said radial gap between said plunger and said central portion of said yoke means, and said secondary path extends around both said coils through said yoke means and across said axial gap between said second stop shoulder of said yoke means and said plunger and through said plunger and through said first stop shoulder of said yoke means.

29. The invention according to claim 28 comprising first nonmagnetic spacer means between said plunger and said first stop shoulder of said yoke means, and second nonmagnetic spacer means between said plunger and said second stop shoulder of said yoke means.

30. An electromagnetically actuated hydraulic switch combination, comprising:

a housing;

hydraulic valve means in said housing including bistable snap blade means operable between different hydraulic circuit positions;

a pair of coaxial coils in said housing energizable to create magnetic flux;

a shuttle plunger in said housing axially reciprocal between first and second positions to actuate said snap blade means, said snap blade means extending transversely to the axial movement of said plunger and having a distal end laterally offset from the axis of reciprocation of said plunger and movable between different hydraulic circuit positions;

magnetically continuous yoke means in said housing for directing the flux paths of said coils, said yoke means having a first portion spaced from said plunger by a first axial gap when said plunger is in said second position, said yoke means having a second portion spaced from said plunger by a second axial gap when said plunger is in said first position, said yoke means having a third portion spaced from said plunger by a third gap in each of said first and second plunger positions;

such that when said plunger is in said second position and said first coil is energized, a primary flux path is created and extends around said first coil through said yoke means and said plunger and across said first and third gaps, and a secondary flux path is created and extends around both said coils through said yoke means and said plunger and across said first gap, said primary path flux force attracting said plunger to said first position to close said first gap, said secondary path flux force attracting said plunger to remain in said second position; and such that when said plunger is in said first position and said second coil is energized, a primary flux path is created and extends around said second coil through said yoke means and said plunger and across said second and third gaps, and a secondary flux path is created and extends around both said coils through said yoke means and said plunger and across said second gap, said last mentioned primary path flux force attracting said plunger to said second position to close said second gap, said last mentioned secondary path flux force attracting said plunger to remain in said first position, the flux paths from the axial ends of said plunger extending substantially only axially to said yoke means, said third portion of said yoke means being a central leg extending radially between said coils, said leg having an inner end facing said plunger and separated therefrom by a radial said third gap, the axial length of said radial gap being no greater than the axial spacing of said coils, the force on said plunger from said primary flux around either said coils always being stronger than the force on said plunger from said secondary flux, such that said plunger moves in either direction responsive to the primary flux in the open gap and actuates said snap blade means.

31. The invention according to claim 30 comprising:

first nonmagnetic spacer means between said yoke means and said plunger in said first position, the ratio of the width of said spacer means to the width of said third gap setting the ratio of said second mentioned primary and secondary flux forces such that the primary flux force is greater than the secondary flux force, and the difference therebetween is greater than the mechanical gradient of said snap blade means; and second nonmagnetic spacer means between said yoke means and said plunger in said second position, the ratio of the width of said second spacer means to the width of said third gap setting the ratio of said first mentioned primary and secondary flux forces such that the primary flux force is greater than the secondary flux force, and the difference therebetween is greater than the mechanical gradient of said snap blade means.

* * * * *